Dec. 12, 1967  R. W. FRIIS ETAL  3,357,890
PRESSURE VESSEL THERMAL INSULATION

Filed Nov. 21, 1966  2 Sheets-Sheet 1

INVENTORS
RONALD W. FRIIS
JOHN E. HENCH
BY
ATTORNEY

Dec. 12, 1967 R. W. FRIIS ETAL 3,357,890
PRESSURE VESSEL THERMAL INSULATION
Filed Nov. 21, 1966 2 Sheets-Sheet 2
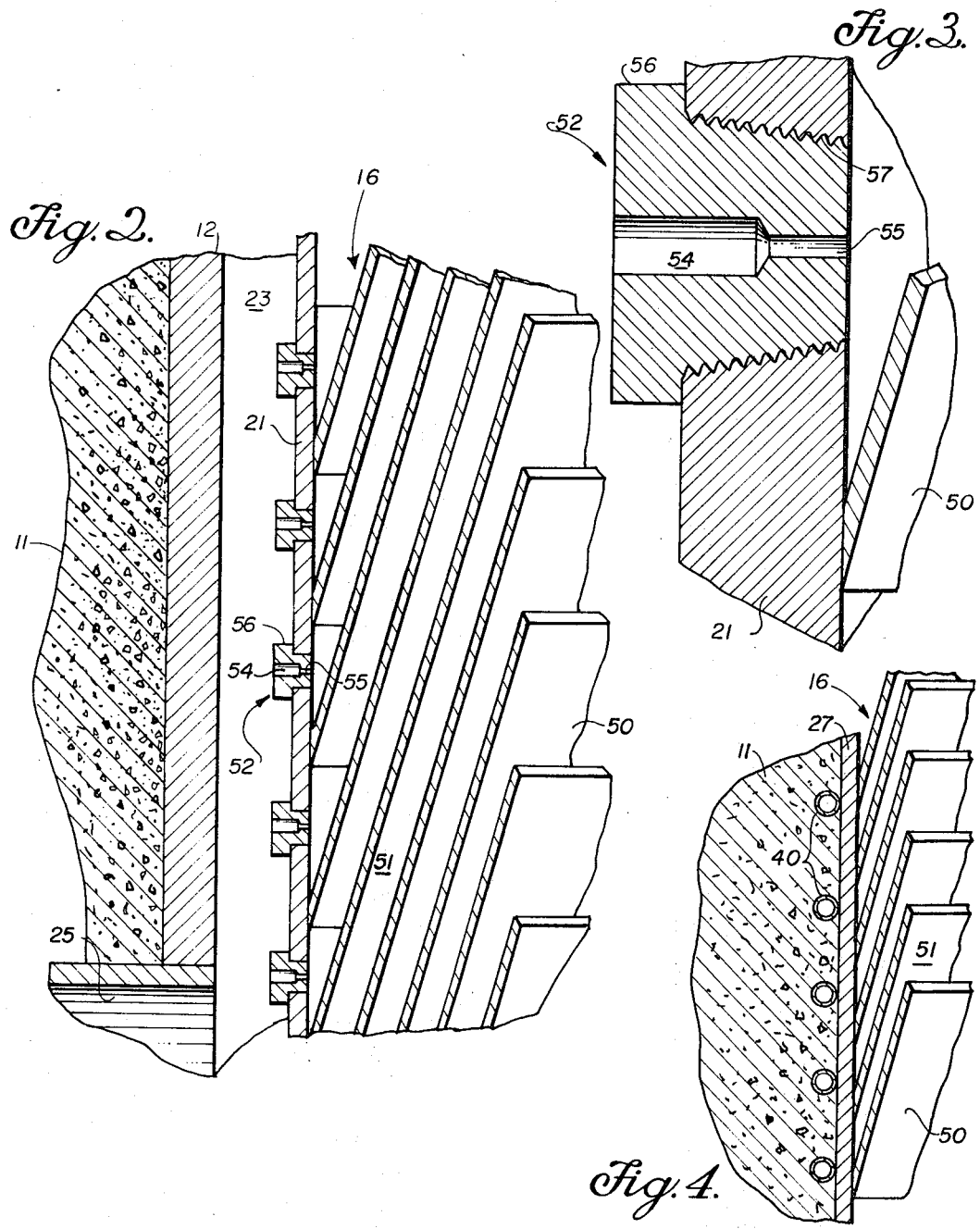
INVENTORS
RONALD W. FRIIS
JOHN E. HENCH
BY
ATTORNEY United States Patent Office 3,357,890
Patented Dec. 12, 1967

3,357,890
PRESSURE VESSEL THERMAL INSULATION
Ronald W. Friis and John E. Hench, San Jose, Calif.,
assignors to the United States of America as represented by the United States Atomic Energy Commission
Filed Nov. 21, 1966, Ser. No. 596,016
7 Claims. (Cl. 176—54)

ABSTRACT OF THE DISCLOSURE

The invention herein relates to a thermal barrier structure for preventing overheating of a concrete nuclear reactor pressure vessel. The thermal barrier situated between the core and the vessel wall, includes spaced apart laminae projecting upwardly at an angle to the flow of heat from said core to said vessel. Coolant may be arranged to flow between the laminae in a direction counter to the direction of flow of heat from the core or to remain static and act in either case as a thermal insulation between laminae.

---

Figure 1:
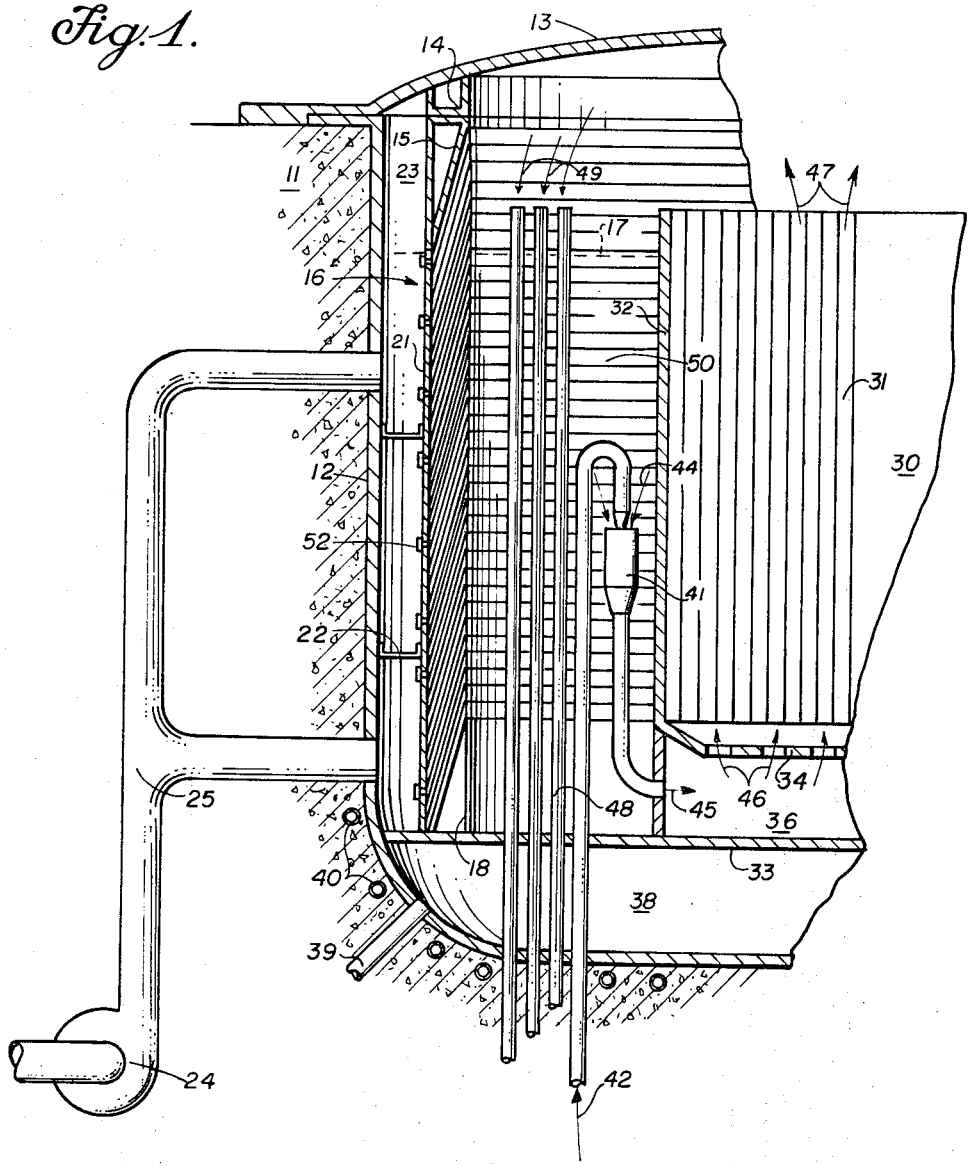

The invention described herein was made in the course of, or under, Contract No. AT(04-3)-189, Project Agreement No. 46, with the United States Atomic Energy Commission.

This invention relates to cooling systems for nuclear reactors, and in particular to a cooling system for reducing the temperature rise of prestressed concrete reactor pressure vessels.

Pressure vessels of the prior art which are used to contain a high temperature heat source such as the core of a nuclear reactor have generally been constructed of heavy steel and other ferrous metals designed to withstand both the high pressures as well as the high temperatures under which such devices operate.

In many respects, prestressed reinforced concrete is ideally suited for use as a means for containing the core of a nuclear reactor, being an inexpensive and easily fabricated material offering combined nuclear radiation shielding and high strength as added features. It is well known, however, that reinforced concrete cannot withstand the high temperatures ordinarily encountered in a pressure vessel region of nuclear reactors without serious loss of strength of the reinforcing or prestressed steel, or loss of compressive strength of the concrete itself due to loss of its water of hydration and other deleterious effects caused by overheating. In addition, temperature fluctuations tend to cause cracking or spalling of concrete due to differential thermal expansion of reinforcing steel, cement and aggregate. Furthermore, temperature gradients throughout the mass of concrete will cause differential expansion of the concrete mass, producing tensile and compressive stresses, further adding to the possibility of cracking.

The temperature level at which these problems begin is above about 150° F., so that for this reason, in boiling water, pressurized water, superheated steam, helium gas and sodium or liquid metal-cooled reactors where the coolant inlet temperatures are all generally above 150° F., the temperature limit at which concrete can ordinarily be used is exceeded. Generally, under such circumstances, cooling of the reinforced concrete pressure vessel itself would be regarded as essential.

It is important that such a cooling system achieve a uniform temperature distribution over the surface of the pressure vessel to avoid any unequal thermal expansion within the mass of the concrete which would produce cracks or spalling or would permit oxygen, moisture or other materials to enter and accelerate the corrosion of the reinforcing steel. The system of the present invention overcomes these problems by interposing a thermal barrier of a particular structure which utilizes the coolant material of the reactor as an insulation and heat flow direction reversal medium. In addition, the cooling system of this invention is adjustable to provide extra cooling for those areas which are exposed to a higher temperature rise than average.

It is therefore an object of this invention to provide a cooling system for a prestressed, reinforced concrete pressure vessel that provides an even temperature distribution within and along the inner surface of the pressure vessel.

It is another object of this invention to provide a cooling system for a prestressed, reinforced concrete pressure vessel that maintains the temperature of said vessel below a value detrimental to the concrete or reinforcing material embedded therein.

It is another object of this invention to provide a cooling system for a nuclear reactor wherein extra cooling effect may be achieved in selected areas of higher temperature than average along the inside of the vessel.

It is another object of this invention to provide a cooling system for a prestressed, reinforced concrete pressure vessel utilized for containing a nuclear reactor core or other high pressure, high temperature vapor generator in which no special heat exchangers are required and which uses a minimum of piping, pumps and other cooling circuit components.

It is a further object of this invention to provide a cooling system for a pressure vessel containing a high temperature heat source that minimizes heat loss from the system.

Other and more particular objects of this invention will be manifest upon study of the following detailed description when taken together with the accompanying drawing, in which:

FIGURE 1 is a vertical section through a typical nuclear reactor steam generator showing the relationship between the concrete pressure vessel, its liner, the heat barrier configuration of this invention, and the reactor core; and FIGURE 2 is an enlarged section of the preferred embodiment of the thermal barrier of this invention, showing details of its configuration; and FIGURE 3 is an enlarged section of one of the flow control means comprising a part of FIGURE 2; and FIGURE 4 is an illustration of another embodiment of the thermal barrier of this invention, showing its arrangement without provision for coolant flow through the barrier.

Typically, the cooling system of this invention may be incorporated in a nuclear reactor illustrated in FIGURE 1. Although the reactor shown is of the boiling water type, it can be seen that the cooling system of this invention can easily be adapted by a person of ordinary skill in the art for incorporation in any other type of reactor, i.e., superheated steam, liquid metal-cooled or gas-cooled reactors.

Basically, the reactor and cooling system shown comprise three portions: a pressure vessel portion, the thermal barrier cooling system portion, and the reactor core region portion.

The pressure vessel portion comprises, briefly, a lower concrete pressure vessel 11, having an inner impermeable vessel liner 12, with a cover member 13 affixed to the lower concrete pressure vessel 11 and liner 12 by bolts, dogs or like means (not shown), common in the art. Cover member 13 is provided about its inner periphery and spaced apart from liner 12 with a depending impermeable flange 14 which abuts the top flange 15 of thermal barrier 16. Flanges 14 and 15 act to prevent excessive flow of coolant out of the top of plenum 23. The thermal barrier 16 is the same in both the steam and liquid regions. The flow can be adjusted at all levels so difference in hydrostatic head can be accounted for.

Due to the efficiency of the cooling system herein, the reinforced or prestressed concrete pressure vessel 11 may be designed in accordance with the usual engineering practice and safety code requirements, with due regard to the pressures involved and at substantially ambient temperature, i.e., below usual maximum operating temperature of about 150° F.

The thermal barrier 16, which will be described in greater detail infra, comprises basically a plurality of spaced-apart coaxial frusto-conical laminae 50 arranged at an angle to the direction of flow of thermal energy from the heat source, i.e., nuclear reactor core 30, and running laterally and supported on a vertical support plate 21 which extends the full circumference about the interior of the pressure vessel portion described above. Spacer braces 22 are provided in the preferred embodiment of this invention to support and maintain the spaced-apart relation between thermal barrier 16 and vessel liner 12 defining plenum 23 therebetween. In addition, spacer braces 22 are provided with openings to permit free flow of coolant along plenum 23. Coolant is directed into plenum 23 by coolant pump 24 through conduit 25.

The reactor core region portion of the illustrated reactor comprises basically core 30 having vertically oriented cooling channels 31 situated in the usual fashion between fuel elements (not shown) and control rods (not shown) common in the art. Core 30 is concentrically enclosed in a core containment barrier 32 which extends down to transverse bottom support barrier 33. At the bottom of core 30, and affixed to vertical containment barrier 32, is core support plate 34 which is spaced apart from transverse support barrier 33 to define plenum 36. Openings 37 are provided in core support plate 34 to permit coolant to flow from plenum 36, up through channels 31 of core 30. Transverse barrier 33 is affixed to the vertical rising sides of liner 12, but is also spaced apart from the horizontal bottom portion of liner 12 to define plenum 38. Plenum 38 is filled with coolant from conduit 39 and provides thermal insulation for the bottom of the reactor vessel. Adequate cooling for the bottom of vessel 11 is provided through coils 40 embedded therein adjacent to the liner 12. The upper portion of vessel 11, which is not exposed in direct contact with coolant in plenum 23, could likewise be cooled. In fact, for the second embodiment of this invention illustrated in FIGURE 4, such cooling is required.

Coolant is supplied to core 30 by means of a plurality of jet pumps 41, distributed peripherally about the exterior of containment barrier 32. Coolant flows into the core 30, not only from a coolant supply (not shown) exterior to the reactor, as indicated by arrows 42 through conduit 43, but also from the body of the coolant within the reactor defined by water level line 17 in the intake of jet pumps 41 as indicated by arrows 44. The combined coolant, as indicated by arrows 45, enters plenum 36, intermixing therein before passing up through openings 37, indicated by arrows 46, to be converted into steam which is exhausted out of the top of core 30 as indicated by arrows 47. The steam above water line 17 then passes into a plurality of conduits 48 extending above water line 17, through the bottom portion of vessel 11 as indicated by arrows 49, and then passes out of the reactor to power conversion or generating means (not shown).

In detail, the thermal barrier and vessel cooling system of this invention comprises a plurality of spaced-apart laminae 50, laterally arranged and projecting upwardly at an angle to the direction of flow of heat from core 30, and assembled on a vertical support plate 21, this assembly surrounding core 30 between said core and pressure vessel 11. Laminae 50 are arranged concentrically at a sufficient angle and are of such a width so that more than one lamina will be interposed in overlapping relation between the heat source and support plate 21 and thereby intercept the flow of heat from said heat source before reaching support plate 21 and thus pressure vessel 11 beyond. The spaces between laminae 50 are arranged large enough to define flow channels 51 therebetween.

Referring particularly to the preferred embodiment illustrated in FIGURE 2, a typical flow channel 51 at its upper end opens into the core region of the reactor and at its lower end terminates in support plate 21, which is provided with a plurality of flow control means 52. Flow control means 52 is illustrated in greater detail in FIGURE 3. It comprises an entry port 54 and an orifice 55, and is arranged to be removable, being held in place by screw threads 57. A hex head or similar grippable form 56 in conjunction with a wrench or like tool (not shown) are the means by which flow control means 52 may be unscrewed for removal or replacement.

As previously described, the thermal barrier 16 of the preferred embodiment of this invention is spaced apart from liner 12 to define plenum 23 into which coolant flows from pump 24, through conduit 25, so that the pressure in plenum 23 is greater therein than the core region of the reactor on the other side of thermal barrier 16. This condition and arrangement results in a flow of coolant defining a sheet of fluid which is tilted at an angle to the direction of flow of heat (for practical purposes, perpendicular to thermal barrier 16) through barrier 16, so that the coolant between one set of laminae 50 acts in two capacities: (1) an insulating material for coolant, laminae and vessel 11 behind it, and (2) as a means for returning heat to the core region by virtue of its flow up channel 51 and into the core region. It should be noted that the typical operating temperatures for core 30 are about 542° F. at a pressure of about 1,000 p.s.i. with water coolant.

Plenum 23 is entirely closed so that all the coolant entering it must exit through thermal barrier 16. The bottom portion of plenum 23 is sealed off by transverse bottom barrier 33 which is affixed both to liner 12, as noted supra, and to bottom flange 18 of thermal barrier 16. The top portion of plenum 23 is sealed off by the peripheral edge of cover means 13 and its depending flange 14 which abuts top flange 15 of thermal barrier 16. The bottom periphery of thermal barrier 16 is sealed off by bottom flange 18.

It should be noted that water line 17 need not be maintained near the bottom edge of top flange 15 of thermal barrier 16. Below the water line the differential pressure across barrier 16 will be constant. The water line within the laminae and in the plenum 23 will be higher than water line 17 by the amount of "head" represented by the pressure difference on each side of barrier 16. This head should be sufficient to raise the water line in the plenum at least up to the cover 13. By adjustment of the flow control means 52, the flow in the vapor region can be made the same as in the liquid region even though the differential pressure is different. The flow coming out of channel 51 that ends in the steam region will run down the sides to the water line 17.

To operate the cooling system of this invention, coolant supply pump 24 is actuated by a driving means (not shown) to pump coolant into plenum 23 through conduit 25. Flow of coolant through multiple distributed openings from conduit 25 into various locations in plenum 23 assures uniform coolant temperature therein. From plenum 23, the coolant enters thermal barrier 16, beginning through entry port 54 and orifice 55 of the plurality of flow control means 52 in support plate 21. The coolant then flows upward in channel 51, acting both as a thermal insulator and heat absorber where its temperature is increased by the time it reaches the upper end of channel 51 to that of the temperature of the coolant in the core region.

The rate of cooling of barrier 16 will be a function of the temperature difference between each side of the barrier, the size of orifice 55, and the pressure difference across the barrier. The rate of flow at various levels along barrier 16 or at spot locations around the barrier can easily be controlled by installing as many flow control means 52 as needed which have smaller or larger orifices 55 depending on the heating or cooling, respectively, desired. Thus, any hot spot in the barrier which might, according to the geometry and equipment of the core region, require a greater volume of coolant flow can be reduced or eliminated, thus avoiding a temperature differential in pressure vessel 11. The total flow of coolant is regulated by adjusting the driving means (not shown) of pump 24 to apply greater or lesser energy to pump 24.

A second embodiment of this invention is illustrated in FIGURE 4. It comprises basically the same elements as the preferred embodiment illustrated in detail in FIGURE 2, with the exception that support plate 21 of FIGURE 2 now becomes support liner 27 in FIGURE 4. Plenum 23, between barrier 16 and liner 12 (FIGURE 2) is eliminated. The cooling afforded by plenum 23 is now performed by coolant flowing in the plurality of cooling coils 40, which in this embodiment completely cover the inside surface of pressure vessel 11, and which are also in thermal conductivity relation with support liner 27. The coolant flowing in coils 40, heated by the thermal energy passing through barrier 16, comprising spaced-apart laminae 50, is returned to the core region of the reactor, either by separate conduit (not shown) or the feedwater system (not shown).

In operations, in this embodiment, coolant in the core region also occupies space 51 between laminae 50. These spaces 51 are arranged to be narrow enough to appreciably reduce convective flow so that the heat flow through barrier 16 across the laminate and spaces is essentially conductive. For a boiling water reactor, space 51 should not exceed about 0.25 inch. In this configuration, the coolant acts primarily as a thermal insulating material. The coolant which is caused to flow through coils 40 is maintained at a temperature which will absorb whatever thermal energy passes through barrier 16, but at the same time not cause the temperature of the concrete in vessel 11 to exceed that which will cause deterioration of the concrete or reinforcing material.

As an example of a typical barrier of this invention, as illustrated in FIGURE 2, the following Table I contains pertinent data for a boiling water reactor.

Table I

| | |
|---|---|
| Core region temperature | 540° F. |
| Plenum 23 temperature | 140° F. |
| Angle of laminae 50 with vertical | 5°. |
| Thickness of laminae | 0.020″. |
| Material | Stainless steel. |
| Spacing between laminae | 0.100″. |
| Rate of flow of coolant between laminae | 50 lb./hr./ft.$^2$ of vessel wall. |
| Height of laminae | 3 ft. |

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. An apparatus for use in proximity to a high temperature heat source comprising, in combination, means defining a vessel containing said high temperature heat source, and thermal barrier means disposed between said heat source and the interior wall of said vessel and comprising a vertical support plate means and a plurality of spaced apart, elongated laminae each affixed at only one end to said support plate, laterally arranged, projecting upwardly and at an angle to the direction of flow of heat from said heat source, said spaced apart laminae having upstanding open ends and defining passages therebetween in substantially unimpeded communication with the interior of said vessel for introduction of coolant in fluid communication with coolant on the heat source side of said barrier.

2. Apparatus as defined in claim 1 wherein said thermal barrier is spaced apart from the interior wall of said vessel defining a plenum therebetween, said thermal barrier further comprising means defining orifice conduits in said support plate communicating said plenum with said passages between said laminae and means for circulating coolant into said plenum through said orifices and between said laminae.

3. Apparatus as defined in claim 1, wherein said spaced apart laminae define a plurality of spaced apart upwardly projecting coaxial frustro-conical sections.

4. Apparatus as defined in claim 1 wherein said vertical support plate defines an impermeable liner and is disposed on the interior wall of said vessel and said thermal barrier further comprises cooling passage means along the outer surface of said support plate.

5. Apparatus as defined in claim 1, wherein said passages between said laminae are of a thickness which substantially reduces convective flow of coolant therein thereby improving the barrier effectiveness to transfer of heat from said source to said material.

6. Apparatus as defined in claim 1 wherein said heat source is the core of a boiling water nuclear reactor and said passages between said laminae are of a thickness in the range of about 0.1 inch to 0.25 inch.

7. Apparatus as defined in claim 1 wherein said material subject to deterioration is prestressed reinforced concrete.

References Cited

UNITED STATES PATENTS

| 2,997,435 | 8/1961 | Millar et al. | 176—87 |
| 3,175,958 | 3/1965 | Bourgade | 176—87 |

FOREIGN PATENTS

| 701,713 | 1/1965 | Canada. |
| 1,408,372 | 7/1965 | France. |
| 891,353 | 3/1962 | Great Britain. |
| 286,658 | 3/1953 | Switzerland. |

L. DEWAYNE RUTLEDGE, *Primary Examiner.*